(12) United States Patent
Kimball

(10) Patent No.: US 7,467,668 B2
(45) Date of Patent: Dec. 23, 2008

(54) TRANSPORT LOCK JOINT FOR STACK FOLD TOOLBAR

(76) Inventor: Von D. Kimball, 62 So. Lakeshore Dr., Ransom Canyon, TX (US) 79366

( * ) Notice: Subject to any disclaimer, the term of this patent is extended or adjusted under 35 U.S.C. 154(b) by 338 days.

(21) Appl. No.: 11/095,801

(22) Filed: Mar. 31, 2005

(65) Prior Publication Data

US 2006/0225900 A1    Oct. 12, 2006

(51) Int. Cl.
*A01B 49/00* (2006.01)
(52) U.S. Cl. .................. 172/311; 172/456; 172/776
(58) Field of Classification Search .......... 172/274, 172/311, 456, 457, 458, 776
See application file for complete search history.

(56) References Cited

U.S. PATENT DOCUMENTS

| | | | | |
|---|---|---|---|---|
| 2,800,758 A | * | 7/1957 | Schmied | 172/456 |
| 3,321,028 A | * | 5/1967 | Groenke | 172/311 |
| 3,495,857 A | * | 2/1970 | Hawke et al. | 403/57 |
| 3,935,696 A | | 2/1976 | Pavel | |
| 3,941,194 A | | 3/1976 | Orthman | |
| 3,951,214 A | | 4/1976 | Ramsower | |
| 4,046,203 A | | 9/1977 | Ward | |
| 4,074,766 A | | 2/1978 | Orthman | |
| 4,113,029 A | | 9/1978 | Ramsower | |
| 4,133,391 A | * | 1/1979 | Richardson et al. | 172/311 |
| 4,244,428 A | | 1/1981 | Sloan | |
| 4,320,805 A | * | 3/1982 | Winter | 172/776 |
| 4,336,846 A | | 6/1982 | Boetto | |
| 4,355,690 A | * | 10/1982 | Jensen et al. | 172/311 |
| 4,371,039 A | | 2/1983 | Schaaf et al. | |
| 4,418,763 A | | 12/1983 | Boetto | |
| 4,453,601 A | | 6/1984 | Orthman et al. | |
| 4,467,875 A | | 8/1984 | Lewison | |
| 4,470,729 A | | 9/1984 | Fredenburg et al. | |
| 4,529,040 A | | 7/1985 | Grollimund | |
| 4,529,043 A | * | 7/1985 | Jensen et al. | 172/776 |
| 4,561,505 A | | 12/1985 | Williamson | |
| 4,619,330 A | * | 10/1986 | Machnee | 172/311 |
| 4,825,958 A | | 5/1989 | Kelderman | |
| 4,867,245 A | * | 9/1989 | Stevens | 172/311 |
| 5,042,587 A | | 8/1991 | Halfmann | |
| 5,178,328 A | * | 1/1993 | Broyhill | 239/168 |
| 5,267,618 A | | 12/1993 | Harrell | |
| 5,921,325 A | * | 7/1999 | Meek et al. | 172/311 |
| 6,003,615 A | | 12/1999 | Moore | |
| 6,035,942 A | | 3/2000 | Smith et al. | |
| 6,082,467 A | | 7/2000 | Friesen | |
| 6,367,562 B1 | * | 4/2002 | Mosdal | 172/311 |
| 6,675,907 B2 | * | 1/2004 | Moser et al. | 172/311 |

* cited by examiner

*Primary Examiner*—Thomas B Will
*Assistant Examiner*—Joel F Mitchell
(74) *Attorney, Agent, or Firm*—Mark Brown

(57) ABSTRACT

A transport lock joint is provided for an implement with a center section and wing sections adapted for stack folding to transport positions over the center section. The lock joint includes an insert element mounted on one of the wing sections and a retainer element mounted on the other wing section. With the implement in its stack-folded transport position, the insert element is received within the retainer element and the wing sections are mutually restrained against relative movement, particularly relative movement associated with the over-the-road travel. Unfolding the implement to a field working position disengages the lock joint by extracting the insert element from the retainer element.

2 Claims, 4 Drawing Sheets

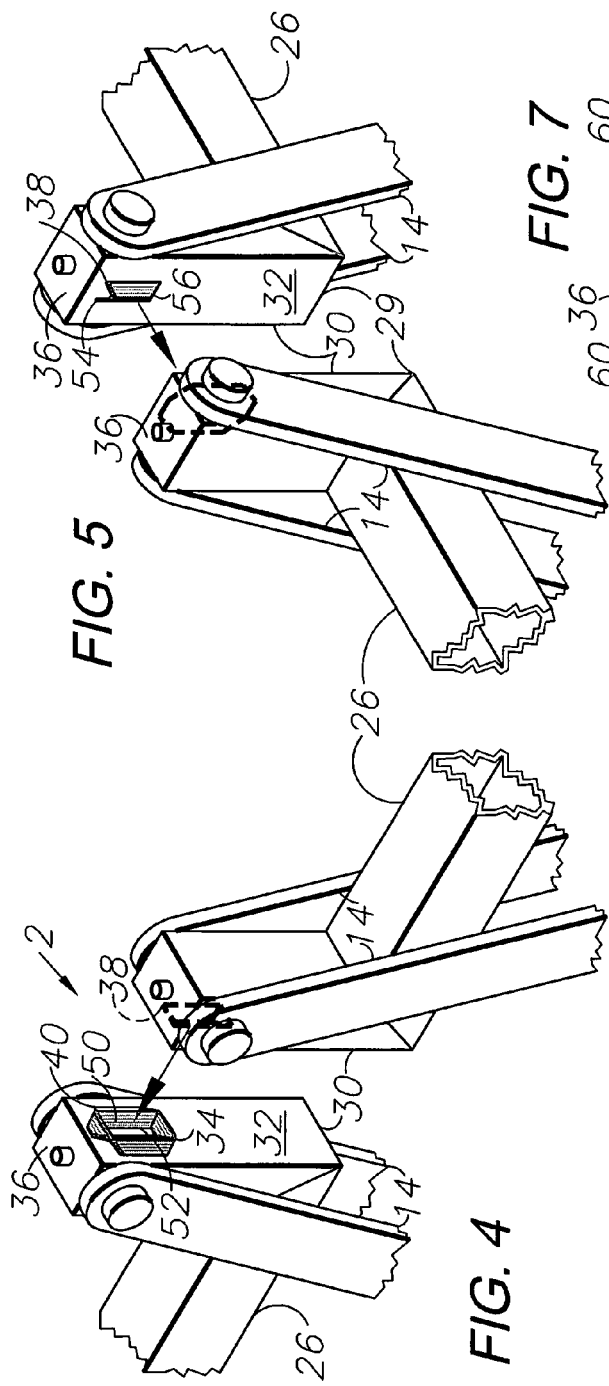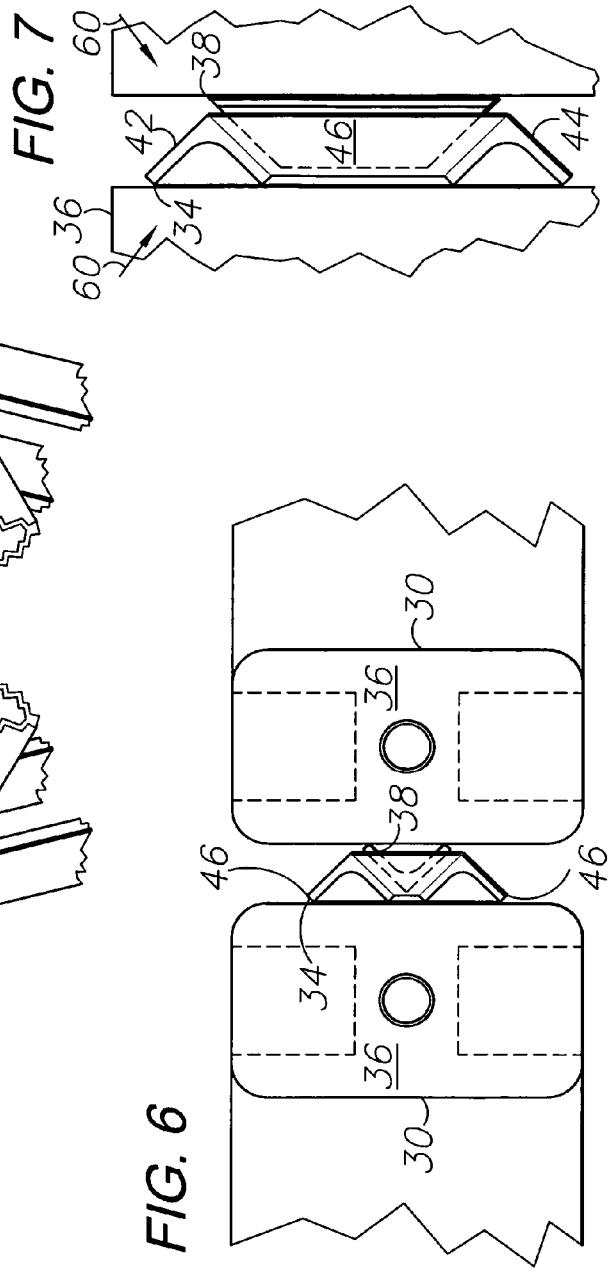

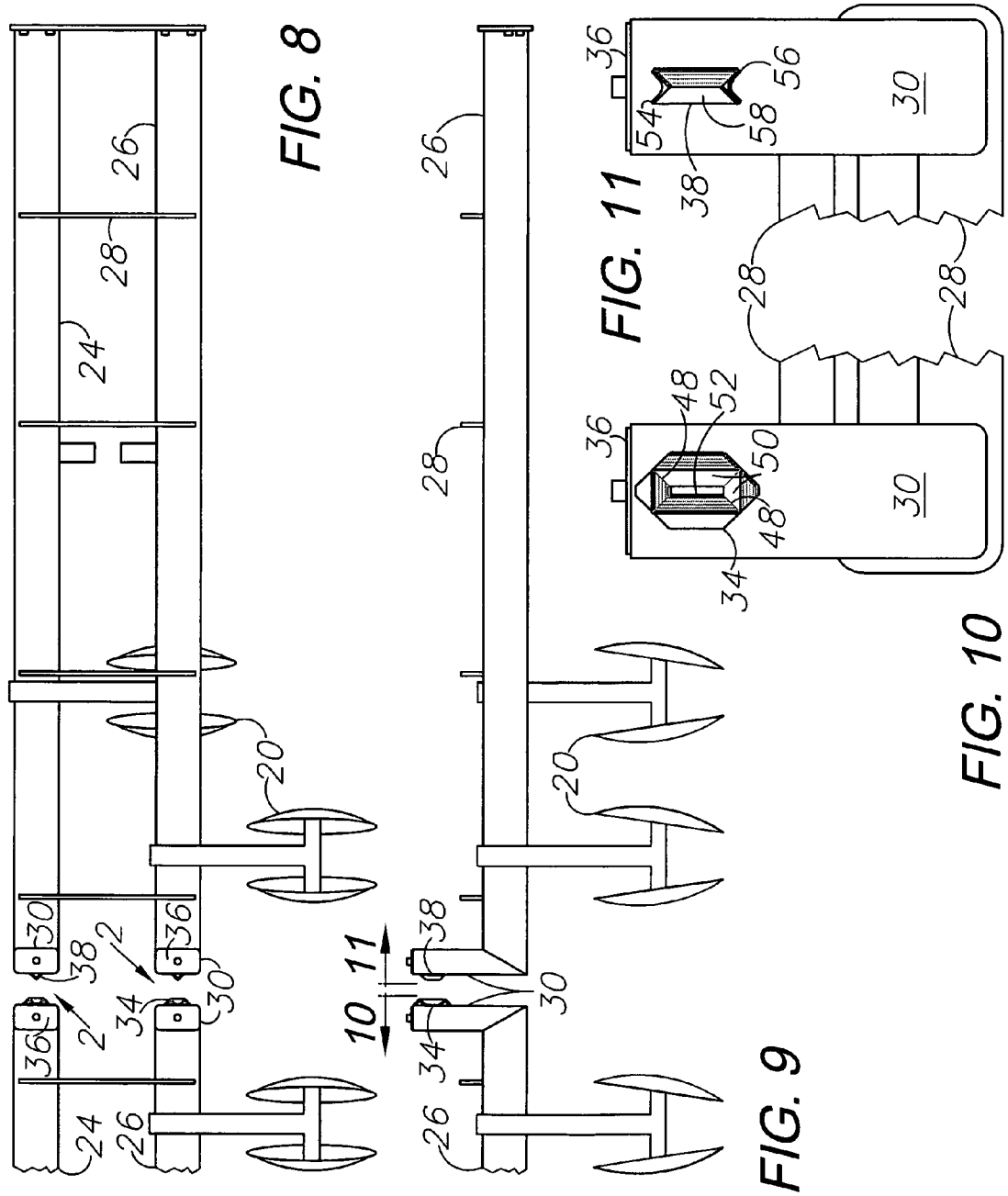

TRANSPORT LOCK JOINT FOR STACK FOLD TOOLBAR

BACKGROUND OF THE INVENTION

1. Field of the Invention

The present invention relates generally to joints for locking first and second components, and in particular to supporting an agricultural implement stack fold toolbar in a folded position for transportation.

2. Description of the Related Art

Implements and equipment for tillage, cultivation and other agricultural operations have been developed with the objectives of increasing efficiency and lowering operating costs. For example, wider equipment tends to be more efficient because greater field areas can be covered with fewer passes in less time. Tractors have tended to become larger in order to accommodate such wider implements and their greater towing power requirements.

Modern agricultural operations commonly require equipment adapted for transporting over public roads. For example, many farmers and farming operations work multiple, noncontiguous fields with the same equipment, which must be configured to comply with traffic regulations, including maximum width requirements. Various implement folding mechanisms have been developed for this purpose. For example, implements are commonly designed with movable sections, which can swing towards the front or the rear in order to reduce the overall implement widths. Implements are also available with wing sections adapted for folding upwardly to overhead positions for transport. General design objectives for folding implements include safety, convenience and efficiency with folding and transporting operations.

A problem associated with previous folding implements relates to structural stresses and loads encountered in transit over public roads. Folding them for transport tends to change their centers of gravity and relocate wheels and other structures that provide support during field operations. For example, implements with outer sections that fold upwardly have higher centers of gravity in their transport than in their working positions, which can affect stability in over-the-road travel. Uneven road surfaces can cause such implements to sway in transit, with resulting wear, stress and possible damage.

Another folding implement design consideration involves toolbar orientation. For example, toolbars equipped with planters are preferably kept level throughout the implement folding sequence in order to avoid spilling the contents of their seed hoppers. The "stack fold" mechanism was developed to keep the wing sections generally level by means of a parallelogram-type geometry. The outboard or wing toolbar sections of a stack fold implement swing upwardly and inwardly from working positions aligned with a center toolbar section to folded, horizontal transport positions located above and generally parallel with the center section. The wing sections remain generally horizontal and level throughout the stack folding sequence. An example of this type of implement folding mechanism is shown in the Moore U.S. Pat. No. 6,003,615. Stack folding implements have folded transport positions that are relatively compact for transportation over public roads and storage. Moreover, seed can be left in the planter hoppers when the wing sections on which they are mounted are lifted and stacked.

Previous stack fold mechanisms located the folded wing sections in spaced relation from each other, thereby allowing them to move independently. However, such independent wing section movements during transit can subject their frames and hydraulics to excessive wear and stress. Such stresses are greater when planters and other tools add to the overall weight of the elevated wing sections. The dynamic loads associated with prior art stack fold implements in their folded, transport positions tend to be exerted against the pivot joints and the hydraulic piston-and-cylinder units, with potentially adverse consequences. The folded wing sections of such prior art stack fold implements were typically independent of each other, and were thus free to move without mutual restraint. The present invention addresses these considerations. Heretofore there is not been available a transport lock joint for stack fold toolbars with the advantages and features of the present invention.

SUMMARY OF THE INVENTION

In the practice of the present invention, a lock joint is provided for mutually restraining the stack folded wing sections of a multi-section implement while in transit. The lock joint includes an insert element mounted on a first wing section and a retainer element mounted on a second wing section. The retainer element includes a receiver adapted for selectively receiving the insert element. The insert and retainer elements are cooperatively configured to mutually restrain the wing sections in their stack folded transport positions and to guide the lock joint into engagement.

BRIEF DESCRIPTION OF THE DRAWINGS

FIG. 4 is an upper, fragmentary, perspective view of the lock joint, taken generally within circle 4/5 in FIG. 3 and particularly showing a retainer element of the lock joint.

FIG. 5 is another upper, fragmentary, perspective view of the lock joint, taken generally within circle 4/5 in FIG. 3 and particularly showing an insert element of the lock joint.

FIG. 6 is a top plan view of the lock joint in its engaged position.

FIG. 7 is a rear elevational view of the lock joint in its engaged position.

FIG. 8 is a top plan view of the wing sections, with a pair of the lock joints shown in slightly-disengaged positions.

FIG. 9 is a rear elevational view of the wing sections shown in FIG. 8.

FIG. 10 is a fragmentary view of the end of a wing section toolbar, taken generally along line 10 in FIG. 9 and particularly showing the lock joint receiver element.

FIG. 11 is a fragmentary view of the end of another wing section toolbar, taken generally along line 11 in FIG. 9 and particularly showing the lock joint insert element.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Forwardly and rearwardly are generally in reference to the direction of travel, if appropriate. Said terminology will include the words specifically mentioned, derivatives thereof and words of similar meaning.

II. Transport Lock Joint 2

Figure 1:
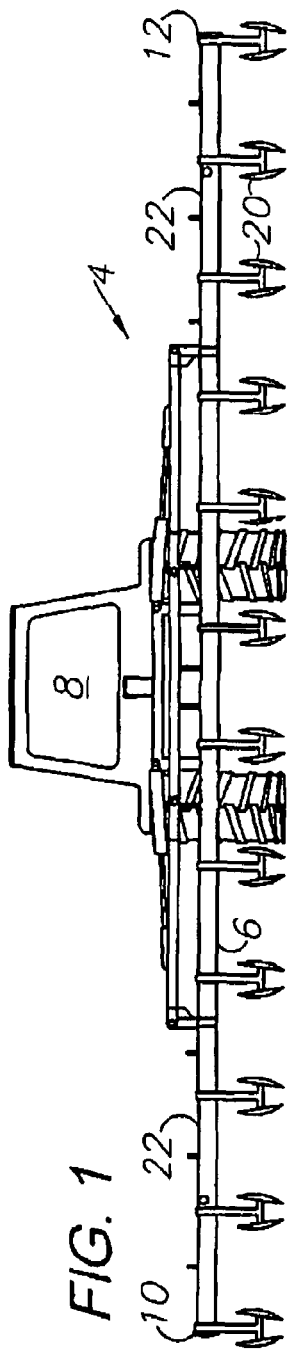
FIG. 1 is a rear view of a stack fold implement, shown in a field working position and mounted on the back of a tractor.
Figure 2:
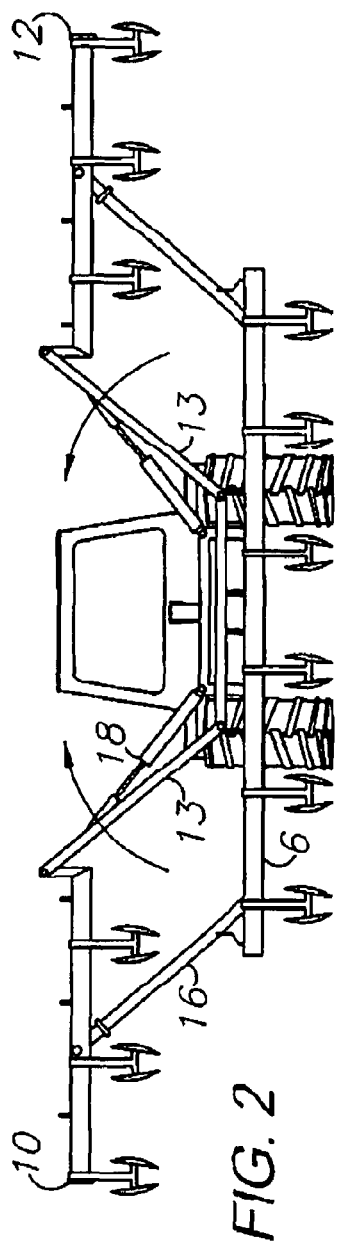
FIG. 2 is a rear view of the implement, shown partly raised to its transport position.
Figure 3:
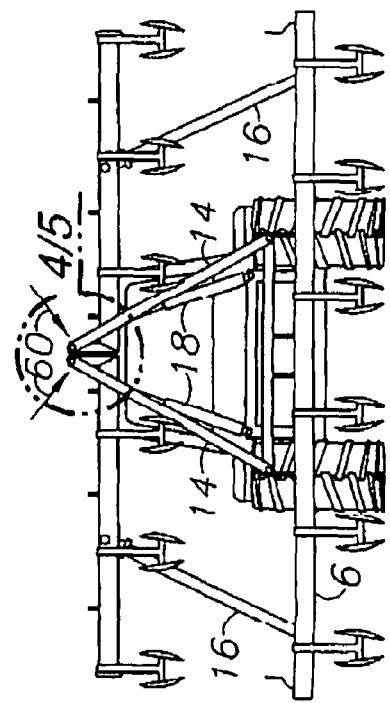
FIG. 3 is a rear view of the implement, shown in its folded, transport position whereat a lock joint embodying the present invention would be engaged.

Referring to the drawings in more detail; the reference numeral 2 generally designates a transport lock joint embodying the present invention, as shown in FIGS. 4-11. FIGS. 1-3 show an exemplary application of the lock joint 2 on a stack fold toolbar implement 4, which can comprise any suitable tillage, cultivation or other equipment. The implement 4 comprises a center section 6 mounted on a tractor 8, for example by a conventional three point hitch arrangement. First and second wing sections 10, 12 are pivotally mounted on the center section 6 by a stack fold mechanism 13 including inboard and outboard pivot arms 14, 16 and hydraulic piston-and-cylinder units 18, which raise and lower the wing sections 10, 12 between their lowered, field working positions (FIG. 1) and their raised, transport positions (FIG. 3). Each toolbar section 6, 10, 12 mounts multiple tools 20, which can comprise any suitable number, variety or combination of tillage, cultivation and other agricultural tools, including without limitation planters, bedders, etc.

Each wing section 10, 12 includes a frame 22 with front and back toolbars 24, 26 connected by stringers 28. As shown in FIGS. 4 and 5, each toolbar 24, 26 terminates at an inboard end 29 with an inboard vertical leg 30 having an engagement face 32. The engagement faces 32 mount the transport lock joint 2, which includes a retainer element 34 mounted on the engagement face 32 of a first wing section 10 in proximity to an upper end 36 of the vertical leg 30. The transport lock joint 2 also includes an insert element or tab 38 mounted on the engagement face 32 of the second wing section 12 in proximity to the upper end 36 of the vertical leg 30 (FIG. 5). The retainer element 34 generally comprises a subframe 40 with upper and lower members 42, 44 and opposite side members 46, which can be fabricated from angle iron pieces with welded miter joints 48 at the corners and angle faces 50, which diverge outwardly and form a receiver 52 having a four-sided, outwardly-diverging configuration. The retainer element in subframe 40 is fastened on the first wing section engagement face 32 by, for example, welding or some other suitable attachment means, such as bolting, riveting, etc. Moreover, the receiver 52 can be formed in the engagement face 32 and the retainer element 34 can be formed integrally therewith.

The insert element 38 can likewise be formed from a piece of angle iron with upper and lower ends 54, 56, which can be miter-cut at a suitable angle, such as 45°. The insert element 38 has opposite faces 58, which converge outwardly from the engagement face 32. The outwardly-converging upper and lower ends 54, 56 and opposite faces 58 of the insert element 38 provide a configuration which cooperates with the configuration of the receiver 52 to facilitate guiding the insert element 38 into the receiver 52 and retaining it therein. For example, the mutually sloping (i.e. diverging/converging) geometries of the retainer and insert elements 34, 38 tend to correct slight misalignments of the wing section opposing faces 32 whereby a relatively secure locking connection is formed when the insert element 38 is fully inserted into the receiver 52. With the implement 4 in its transport position (FIG. 3), the over-center geometry of the parallelogram-type stack fold mechanism causes the toolbars 24, 26 to rest against each other under gravitational force, as indicated by the engaging force arrows 60. The wing sections 10, 12 are thus mutually restrained in a transport position, whereby relative movement therebetween is restricted.

Figure 12:
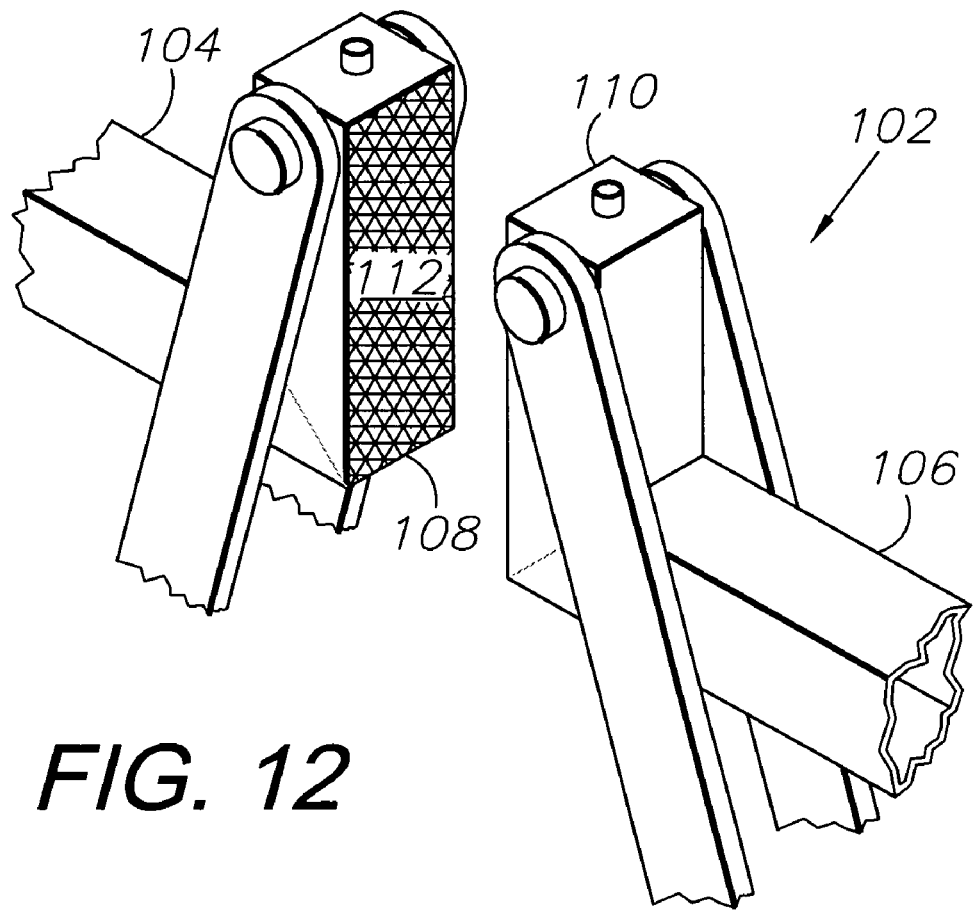
FIG. 12 is a fragmentary, perspective view of a stack folding toolbar construction comprising an alternative embodiment of the present invention, with toolbar ends adapted for supporting engagement.
Figure 13:
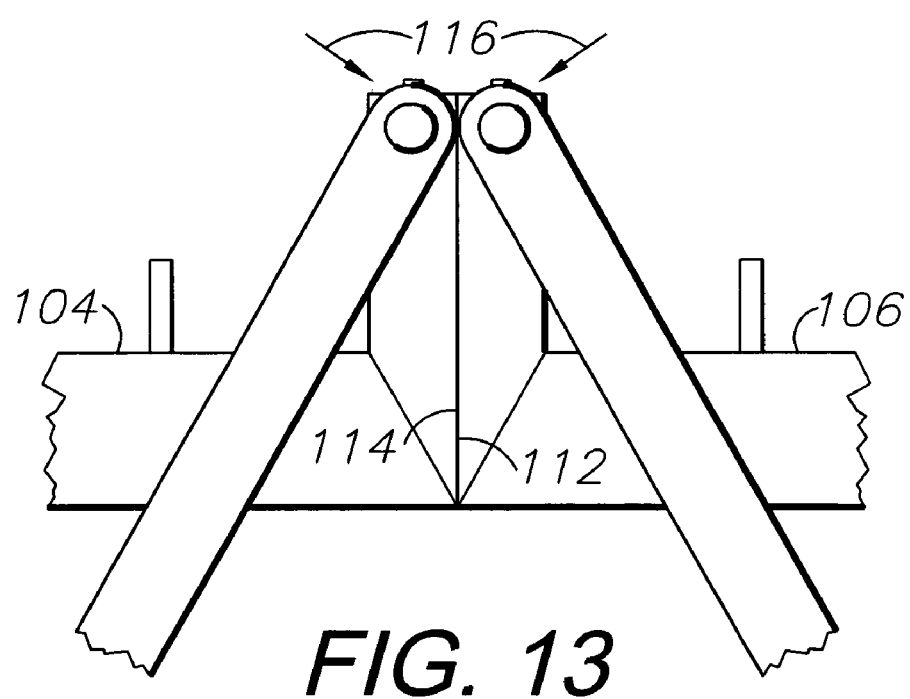
FIG. 13 is a front elevational view of the toolbar ends engaged in a mutually-supportive, stack-folded, transport position.

A stack fold toolbar implement 102 adapted for supporting engagement in a transport configuration comprising an alternative embodiment of the present invention is shown in FIGS. 12 and 13. The implement 102 includes toolbars 104, 106 with respective inner ends 108, 110 having engagement areas 112, 114 and is generally designated by the reference numeral 102. With the implement 102 in its transport configuration with the toolbars 104, 106 stack-folded, the engagement areas are in direct, mutually-supporting contact whereby relative movement therebetween is minimized. It will be appreciated that various alternative structures can be provided at the toolbar ends for the purpose of providing such supporting engagement. For example, they can be finished like the other parts of the toolbars whereby gravitational and fractional forces tend to retain them in engagement. Alternatively, materials with high coefficients of friction can be applied to the engagement areas 112, 114. Identical sets of serrations can be provided on the engagement areas 112, 114 for retaining the toolbar ends 108, 110 in mutually-supporting engagement. Interlocking sets of fingers with complementary configurations can also be provided. Moreover, various fasteners, latches, locks, magnets, etc. can be utilized for retaining the toolbar ends 108, 110 in mutually-supporting engagement. Force arrows 116 show the resultant vector forces comprising a combination of downward (vertical Z-axis) and inward (transverse X-axis) force components, which tend to support the wing sections and constrain them against relative movement in their respective positions.

It is to be understood that the invention can be embodied in various forms, and is not to be limited to the examples discussed above. Other components and configurations can be utilized in the practice of the present invention.

Having thus described the invention, what is claimed as new and desired to be secured by Letters Patent is:

1. In combination with a stack fold implement having a center section adapted for connection to a tow vehicle and first and second wing sections mounted on respective outboard ends of said center section, said implement being reconfigurable between a field working position with said wing sections generally aligned with said center section and a stack fold transport position with said wing sections rotated upwardly and inwardly to respective stack folded positions over said center section, said wing sections having respective front and back toolbars with inboard ends, said front toolbar inboard ends and said back toolbar inboard ends being positioned in opposing relation over said center section with said implement in its transport position, the improvement of a transport support, which comprises:

each said wing section having an engagement structure associated with a respective toolbar inner end;

said wing section engagement structures engaging whereby said wing sections are stabilized relative to each other in said transport position;

an insert element mounted on one of the toolbar inboard ends of the first wing section and projecting therefrom in an inboard direction;

a retainer element mounted on a corresponding toolbar inboard end of the second wing section, which toolbar end is positioned in opposed relation to said first wing section toolbar end with said implement in its transport position, said retainer element including a receiver open in an inboard direction and adapted to removably receive said insert element with said implement in its transport position;

said first and second wing section toolbars having respective vertical legs located at their inboard ends, said vertical legs having engagement faces adapted for positioning in generally opposed relation with said implement in its transport position;

said insert element comprising a tab extending outwardly from a respective engagement face;

said receiver being associated with an opposed engagement face;

said tab having an outwardly-converging configuration;

a retainer element mounted on a respective engagement face and including said receiver, said retainer having an outwardly-diverging configuration cooperating with said tab configuration to receive and retain said tab in said receiver with said implement in its locked position;

said retainer element comprising a subframe with top, bottom and opposite side perimeter members enclosing said receiver;

each said member having an outwardly-diverging face;

said receiver being formed by said outwardly-diverging member faces; and said insert element having a pair of outwardly-converging faces adapted for engaging a corresponding pair of retainer subframe outwardly-diverging faces whereby said wing sections are guided to their locked position by the corresponding configurations of said extension and said retainer.

2. In combination with a stack fold implement having a center section adapted for connection to a tow vehicle and first and second wing sections mounted on respective outboard ends of said center section, said implement being reconfigurable between a field working position with said wing sections generally aligned with said center section and a stack fold transport position with said wing sections rotated upwardly and inwardly to respective over-center stack folded positions over said center section and forming respective parallelograms with said center section, said wing sections having respective front and back toolbars with inboard ends, said front toolbar inboard ends and said back toolbar inboard ends being positioned in opposing relation over said center section with said implement in its transport position, the improvement of a transport support, which comprises:

each said wing section having an engagement structure associated with a respective toolbar inner end;

said wing section engagement structures engaging whereby said wing sections are stabilized relative to each other in said transport position;

one of said engagement structures including an insert element mounted on one of the toolbar inboard ends of the first wing section and projecting therefrom in an inboard direction;

the other of said engagement structures including a retainer element mounted on a corresponding toolbar inboard end of the second wing section, which toolbar end is positioned in opposed relation to said first wing section toolbar end with said implement in its transport position, said retainer element including a receiver open in an inboard direction and adapted to removably receive said insert element with said implement in its transport position;

said first and second wing section toolbars having respective vertical legs located at their inboard ends, said vertical legs having engagement faces adapted for positioning in generally opposed relation with said implement in its transport position;

said insert element comprising a tab extending outwardly from a respective engagement face;

said receiver being associated with an opposed engagement face;

said tab having an outwardly-converging configuration;

a retainer element mounted on a respective engagement face and including said receiver, said retainer having an outwardly-diverging configuration cooperating with said tab configuration to receive and retain said tab in said receiver with said implement in its locked position;

said retainer element comprising a subframe with top, bottom and opposite side perimeter members enclosing said receiver;

each said member having an outwardly-diverging face;

said receiver being formed by said outwardly-diverging member faces; and said insert element having a pair of outwardly-converging faces adapted for engaging a corresponding pair of retainer subframe outwardly-diverging faces whereby said wing sections are guided to their locked position by the corresponding configurations of said extension and said retainer.

* * * * *